(12) United States Patent
Menu et al.

(10) Patent No.: US 6,394,123 B2
(45) Date of Patent: May 28, 2002

(54) LIQUID CIRCUIT RESERVOIR

(75) Inventors: Philippe René Oswald Menu, Remicourt; Alain Pascal Jacques Hemmer, Brussels; Albert René Maurice Joseph Cornet, Verviers, all of (BE)

(73) Assignee: Techspace Aero, Milmort-Hertstal (BE)

( * ) Notice: Subject to any disclaimer, the term of this patent is extended or adjusted under 35 U.S.C. 154(b) by 0 days.

(21) Appl. No.: 09/725,565

(22) Filed: Nov. 30, 2000

(30) Foreign Application Priority Data

Dec. 2, 1999 (EP) .............................................. 99204094

(51) Int. Cl.$^7$ ............................................... F16K 24/04
(52) U.S. Cl. ........................... 137/43; 137/171; 137/587
(58) Field of Search ........................... 137/43, 171, 587

(56) References Cited

U.S. PATENT DOCUMENTS 2,860,648 A  11/1958  Harrison
2,942,612 A  * 6/1960  Klank .......................... 137/43
2,975,793 A  3/1961  Klank, Jr.

FOREIGN PATENT DOCUMENTS

EP  0 781 677 A1  7/1997
GB  580006  8/1946

* cited by examiner

*Primary Examiner*—Gerald A. Michalsky
(74) *Attorney, Agent, or Firm*—Oblon, Spivak, McClelland, Maier & Neustadt, P.C.

(57) ABSTRACT

A reservoir for a liquid circuit has a partition dividing it into an upper chamber and a bottom chamber from which liquid is drawn via an outlet conduit. An inlet conduit for returning liquid to the reservoir opens into a deaerator which is mounted on the partition so that the liquid is returned into the bottom chamber and the separated gas is discharged through a degassing orifice which opens into the upper chamber. The deaerator is provided with a valve which closes the degassing orifice when the reservoir is inverted or subjected or negative gravity, thus ensuring the continuing supply of liquid to the circuit under all operating conditions.

1 Claim, 2 Drawing Sheets

LIQUID CIRCUIT RESERVOIR

BACKGROUND OF THE INVENTION

1. Field of the Invention

The invention relates to a reservoir for a liquid circuit, and more particularly to a reservoir construction for ensuring correct feeding of the circuit under all circumstances, even when the reservoir is inverted.

2. Summary of the Prior Art

Reservoirs in liquid circuits act to collect the excess liquid in the circuit for recirculation. They communicate with the circuit by way of an inlet conduit which returns the liquid from the remainder of the circuit, and by way of an outlet conduit through which liquid for the circuit is aspirated by pumps. Since reservoirs of this kind are only partly full the outlet conduit draws from the bottom of the reservoir. However, when the reservoir is inverted, as occurs when it is part of a liquid circuit in an aircraft and the aircraft flies upside-down, or more generally when it is subjected to conditions of gravity reversal, the liquid flows to the other side of the reservoir and leaves the outlet conduit dry, so that the supply of liquid to the circuit is temporarily interrupted.

An arrangement for obviating this disadvantage is disclosed in French patent No. 2621662, from which FIG. 1 of the attached drawings is taken. FIG. 1 shows a reservoir 1 which is divided into two chambers by a perforated horizontal partition 2. The inlet conduit 4 opens into the top chamber 5 and the outlet conduit 6 is at the bottom of the lower chamber 7. A valve 8 is installed below the partition 2 and consists of a flexible diaphragm riveted at its centre to the partition 2 by an element 3. The liquid entering from the inlet conduit 4 accumulates on the partition 2, flows through the perforations therein and bends the valve 8 into an umbrella shape to allow it into the lower chamber 7. When the reservoir 1 is inverted, the liquid filling the lower chamber 7 weighs on the valve 8, which thus closes and prevents the liquid from returning to the top chamber 5. The outlet conduit 6 is extended by a tube 9 which projects into the lower chamber 7, and is able to aspirate liquid provided the liquid level in the chamber 7 is above the edge 10 of the tube 9—i.e. provided the liquid occupies substantially the volume 11 indicated in FIG. 1. However, supply of liquid to the circuit is still interrupted when the volume 11 falls, so that in practice the reservoir 1 must be larger than the conventional reservoirs in order to accommodate the tube 9 and the required volume of liquid around it, such volume remaining stagnant and unused under normal flight conditions.

Constructions are also known in which the reservoir comprises a partition which divides the reservoir to define a bottom chamber therein and which is provided with at least one aperture. The liquid inlet and outlet conduits both open into the bottom chamber and the partition aperture is arranged to remain permanently open whatever the position or orientation of the reservoir—i.e., the partition is valveless. Since the bottom of the reservoir is fairly close to the partition, the reservoir volume is reduced. The bottom chamber is normally completely full and the excess liquid forms a reserve in the top chamber. When the reservoir is inverted the inlet conduit continues to feed liquid into the bottom chamber so that the outlet conduit cannot run dry even during a long period of inversion. Liquid leakage from the bottom chamber is tolerated but total emptying of the bottom chamber is avoided if the partition is constructed as an inverted tray or if the apertures in the partition are bounded by edges extending from the partition towards the bottom of the reservoir.

However, this construction cannot ensure that liquid leaving the reservoir through the outlet conduit is completely free from gas bubbles, because bubbles introduced into the reservoir through the inlet conduit accumulate below the partition under normal conditions and rise through the bottom chamber towards the outlet conduit when the reservoir is inverted. Also, hydraulic control circuits for engines, a field in which the invention is particularly applicable, are usually well degassed except in special circumstances such as purging or abrupt manoeuvring, when large gas bubbles may be formed and may therefore occupy much of the bottom chamber and be aspirated through the outlet line even if positive gravity is maintained. The apertures with which the partition is sometimes provided for gradually removing the gas from the bottom chamber are then ineffective, and they still have the disadvantage of allowing the bottom chamber to empty during a prolonged period of negative gravity. Because of this, the construction in unacceptable and the present invention aims to overcome these disadvantages.

SUMMARY OF THE INVENTION

Accordingly, the invention provides a reservoir for a liquid circuit, comprising a partition dividing said reservoir to define a bottom chamber therein, means defining at least one aperture in said partition adapted to remain open in any position of said reservoir, a liquid inlet conduit opening into said bottom chamber, a liquid outlet conduit leading from said bottom chamber, a deaerator mounted on said partition in communication with said bottom chamber, said deaerator having a degassing orifice which opens outside said bottom chamber, and a valve which is operable by gravity to close said degassing orifice when said reservoir is inverted or subjected to negative gravity.

The deaerator extends through the partition with its degassing orifice disposed outside the bottom chamber, with the result that the contents of the bottom chamber remain completely liquid and the feed to the circuit is of good quality. Also, leakage of liquid through the degassing orifice in the event of inversion is prevented by the valve which is associated with the orifice and which closes under gravity in the event of inversion or negative gravity.

DESCRIPTION OF THE PREFERRED EMBODIMENT

Figure 1:
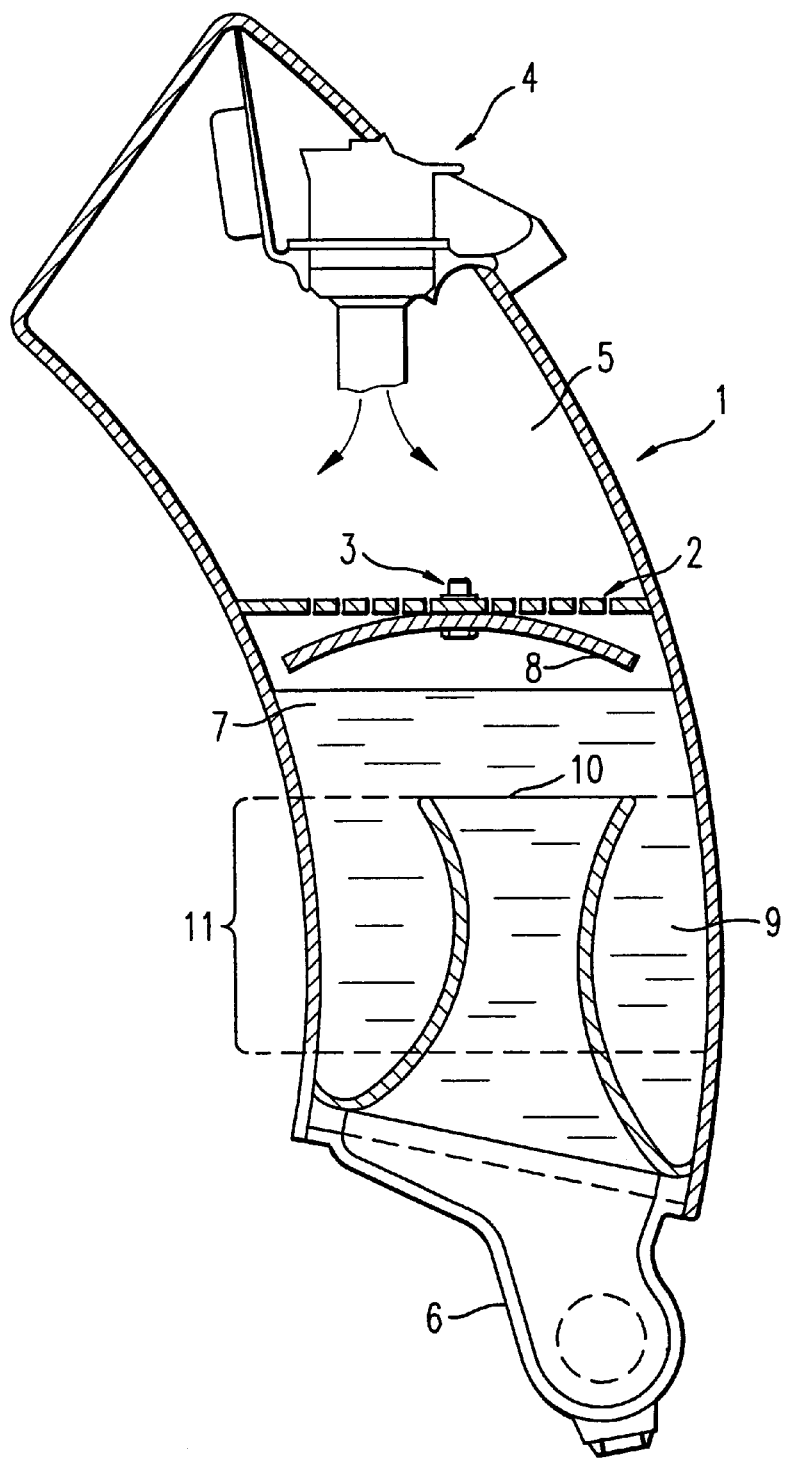
FIG. 1 is a schematic sectional view of a prior art reservoir.
Figure 2:
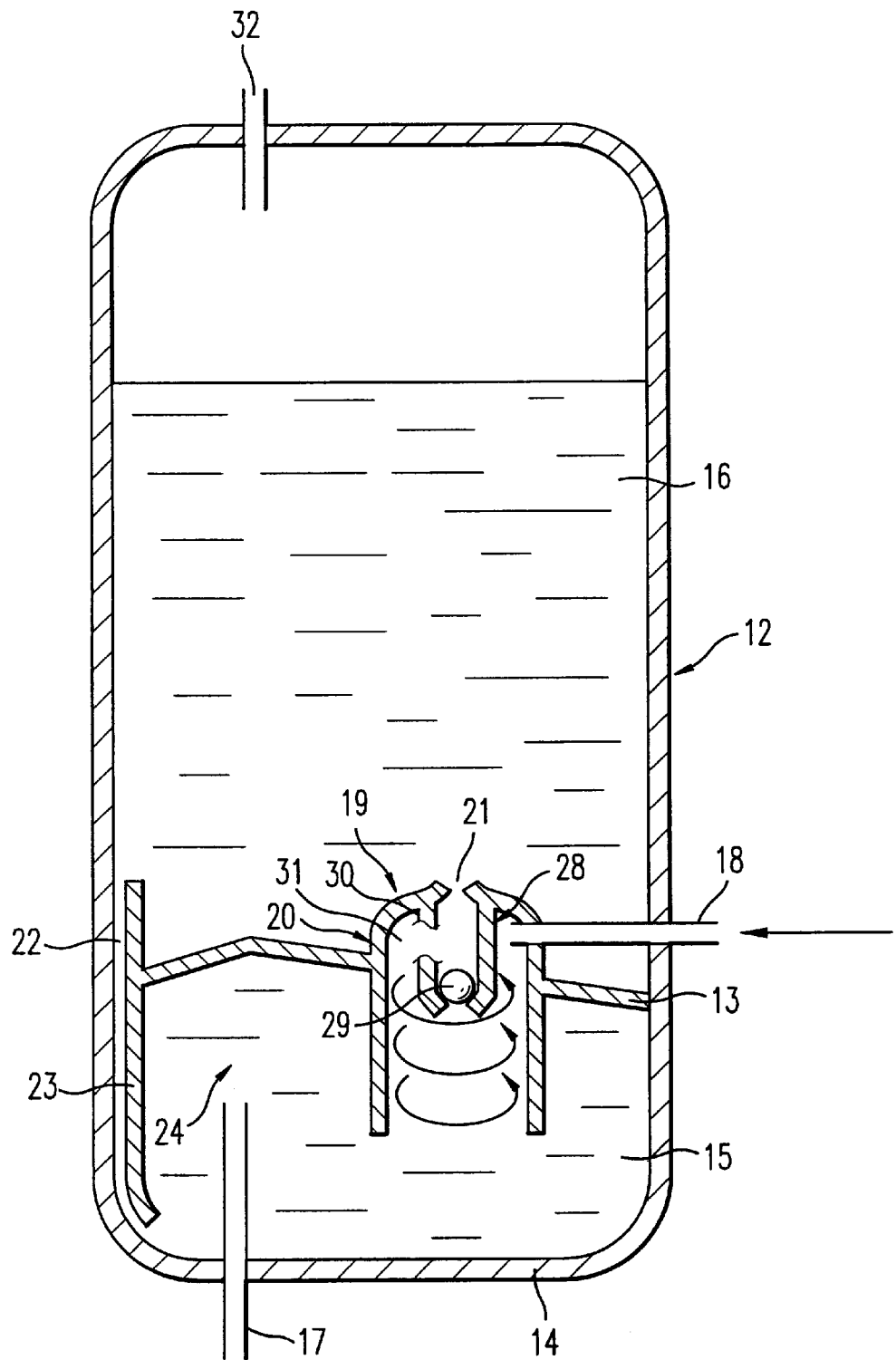
FIG. 2 is a schematic sectional view of a preferred embodiment of a reservoir according to the invention.

The reservoir shown in FIG. 2 has the general reference 12, and a partition 13 near the bottom 14 of the reservoir divides it into a bottom chamber 15 which is smaller than the bottom chamber of the reservoir shown in FIG. 1, and a top chamber 16. An outlet conduit 17 leads from the bottom chamber 15 through the bottom 14 of the reservoir in a conventional manner. An inlet conduit 18 also communicates with the bottom chamber 15 of the reservoir 12, the conduit 18 opening into a deaerator 19 which is mounted on and extends through the partition 13. The deaerator 19 has a centrifugal action, the inlet conduit 18 delivering the liquid-gas emulsion tangentially into the domed top 20 of the deaerator to impart a whirling motion to the liquid-gas emulsion which concentrates the liquid towards the wall and the gas towards the centre of the deaerator. The gas rises towards the top of the dome 20 and leaves through a degassing orifice 21 provided at the top of the dome 20, whereas the degassed liquid drops downwards into the bottom chamber 15. The degassing orifice 21 opens into the top chamber 16 since the dome 20 of the deaerator projects through the partition 13. Separation of the gas and liquid is enhanced since they are discharged on opposite sides of the partition 13. The deaerator is normally totally immersed because the top chamber 16 is partly full, but that does not alter its operation.

The partition 13 is continuous across the reservoir 12 except for a small aperture 22 which is surrounded by a wall 23 which extends from the partition 13 almost as far as the reservoir bottom 14. This wall 23 co-operates with the partition 13 to form an inverted tray 24 in which liquid can accumulate when the reservoir is inverted, and the outlet conduit 17 opens above the lower end of the wall 23. The entrance to the outlet conduit 17 therefore remains immersed in the liquid filling the bottom chamber 15, which continues to be fed by the inlet conduit 18, when the reservoir is inverted.

To limit leakage of liquid into the top chamber 16 when the reservoir is inverted, the deaerator has a valve 28 which opens or closes the degassing orifice 21. The valve 28 basically consists of a ball 29 which is movable within a vertical sleeve 30 by gravity, the sleeve 30 surrounding the degassing aperture 21 at the top and extending axially downwards within the deaerator. When the reservoir is oriented the right way up, the ball 29 sits at the bottom of the sleeve so that gas is able to enter the sleeve 30 through an aperture 31 in its side wall and then to be discharged through the open degassing orifice 21. However, when the reservoir is inverted or is subjected to negative gravity, the ball 29 moves to the top of the sleeve 30 where it closes the degassing orifice 21.

Tests have showed that the deaerator 19 is satisfactorily sealed by the valve 28 when fully immersed and can deal effectively with a large incoming gas bubble.

The reference 32 denotes an external pressure connection at the top of the reservoir 12, the connection 32 serving to vent gas accumulating in the reservoir 12 but playing no direct part in the operation of the invention.

An important application for the invention is the reservoirs in the hydraulic circuits of aircraft flight controls and other aircraft equipment.

We claim:

1. A reservoir for a liquid circuit, comprising a partition dividing said reservoir to define a bottom chamber therein, means defining at least one aperture in said partition adapted to remain open in any position of said reservoir, a liquid inlet conduit opening into said bottom chamber, a liquid outlet conduit leading from said bottom chamber, a deaerator mounted on said partition in communication with said bottom chamber, said deaerator having a degassing orifice which opens outside said bottom chamber, and a valve which is operable by gravity to close said degassing orifice when said reservoir is inverted or subjected to negative gravity.

* * * * *